Patented Mar. 18, 1941

2,235,754

UNITED STATES PATENT OFFICE 2,235,754

HYDRAULIC BRAKE FLUID COMPOSITION

Thomas J. Bagley, Haddonfield, N. J., assignor to R. M. Hollingshead Corporation, Camden, N. J., a corporation of New Jersey No Drawing. Application May 27, 1938, Serial No. 210,487

5 Claims. (Cl. 252—77)

The present invention relates to certain new and useful hydraulic brake fluids, particularly for the hydraulic braking systems of automobiles, and has for its object the provision of a fluid which will have a suitably low freezing point and a suitably high boiling point and low vapor pressure, which will not have any deleterious action on the metallic and non-metallic parts of the hydraulic brake system with which it comes in contact, which will not deteriorate in any way, and which will possess suitable lubricating qualities and tend to maintain a comparatively uniform viscosity and will not tend to leak out.

With the above and other objects in view, the present invention consists of a novel composition of matter including a soap and an alcohol.

I have found that certain salts of fatty acids, as for instance, that produced by the combination of ricinoleic acid and an alkali such as caustic potash or diethanol amine or triethanol amine or caustic soda, dissolved in an alcohol, will produce a hydraulic brake fluid composition highly desirable and useful and possessing all the qualities hereinabove set forth.

In the preferred embodiment of the present invention, ricinoleic acid is combined with enough alkali, such as caustic potash or caustic soda or triethanol amine or diethanol amine, to produce a substantially neutral product. The resultant product is then dissolved in ethyl alcohol or butyl alcohol or di-acetone alcohol or acetone or isopropyl alcohol or methyl alcohol, or some of the more fluid dihydric alcohols having low freezing point, such as ethylene glycol and diethyleneglycol. The proportion in using ethyl alcohol and butyl alcohol is about 25%, more or less, of the neutral mixture, to 75%, more or less, of the alcohol. These proportions may be varied according to the freezing point or boiling point limits desired. From 5 to 40% of a neutral salt of ricinoleic acid, and the balance alcohol, have been found to be the optimum range; although I prefer from 10 or 15 to 40% of neutral salt of ricinoleic acid.

The product may also be made by hydrolizing and breaking down castor oil and then neutralizing the resultant ricinoleic acid in the manner above indicated.

In modified embodiments of the present invention, soyabean oil, corn oil, and palm oil may also be used in forming the neutral salt of the fatty acid.

In forming the neutral salt of the fatty acid with caustic potash or caustic soda, the resultant neutral salt may contain a small amount of water, that is, about 10% water. This water may be eliminated, however, by heat. In using the diethanol amine or triethanol amine, the resultant neutral salt of a fatty acid will be generally water-free.

It is also found that the triethanol amine will also act in the resultant composition as a rust inhibitor.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A hydraulic brake fluid composition consisting of from 15 to 40% of a neutral triethanol amine salt of ricinoleic acid and the balance an alcohol of the group consisting of ethyl alcohol, butyl alcohol, di-acetone alcohol, isopropyl alcohol, methyl alcohol, ethyleneglycol and diethyleneglycol.

2. A hydraulic brake fluid composition consisting of a neutral triethanol amine salt of ricinoleic acid and ethyl alcohol.

3. A hydraulic brake fluid consisting of from 5 to 40% of a neutral tri-ethanol amine salt of ricinoleic acid and the balance alcohol.

4. A hydraulic brake fluid consisting of a neutral triethanol amine salt of ricinoleic acid dissolved in butyl alcohol.

5. A hydraulic brake fluid consisting of a neutral triethanol amine salt of ricinoleic acid dissolved in iso-propyl alcohol.

THOMAS J. BAGLEY.